United States Patent Office 3,584,081
Patented June 8, 1971

3,584,081
THERMOPLASTIC COMPOSITION OF THERMALLY CROSS-LINKED STYRENE-BUTADIENE COPOLYMER BLENDED WITH STYRENE-ACRYLONITRILE COPOLYMER
Josef Dasch, Haltern, Germany, assignor to Chemische Werke Huels A.G., Marl, Germany
No Drawing. Continuation of application Ser. No. 601,302, Dec. 13, 1966. This application Dec. 29, 1969, Ser. No. 888,152
Claims priority, application Germany, Dec. 22, 1965, C 37,742
Int. Cl. C08f 29/12
U.S. Cl. 260—893     8 Claims

ABSTRACT OF THE DISCLOSURE

To overcome the white fracture problem associated with transparent articles produced from polymeric blends, and also to obtain tough transparent articles having high-flexural strengths, there is provided a homogeneous blend of:

(1) 3–17 parts by weight of a highly thermally cross-linked, preferably to the extent of at least 90% rubbery copolymer of styrene-butadiene; and
(2) 83–97 parts by weight of a thermoplastic copolymer of styrene-acrylonitrile;

with the provision that the rubbery styrene-butadiene copolymer was copolymerized in the presence of up to about 0.1% of a control agent, such as alkyl mercaptan, the weight ratio of butadiene to styrene being 35:65 to 65:35 and the proportion in the thermoplastic copolymer being 65–83% styrene and 17–35% acrylonitrile.

---

This application is a continuation of S.N. 601,302, filed Dec. 13, 1966, now abandoned.

This invention is directed generally to a new and improved polymeric composition and more specifically to a thermoplastic composition useful for the production of transparent, tough and flexibly strong bodies without white fracture.

Still more specifically, this invention relates to thermoplastic compositions and a method of preparing molded or extruded bodies without white fracture which comprises a rubbery copolymer of butadiene and styrene and a thermoplastic copolymer of styrene and acrylonitrile. Homogeneous blends of the rubbery copolymer and the thermoplastic copolymer are particularly useful for the production of transparent articles having high-flexural strengths, improved-impact resistance and high-tear strengths. These thermoplastic blends of the two different copolymers may be used to produce various structures without white fracture including, for example, plastic glasses, bottles, cups, films, tubing and other articles requiring strength characteristics, etc.

Heretofore, various thermoplastic compositions have been prepared which consisted essentially of a rubbery copolymer of butadiene, styrene or acrylonitrile, and a thermoplastic copolymer of styrene and acrylonitrile and the like. In many of these blends, however, the thermoplastic component usually contained 50–85% by weight of styrene and 15–50% by weight of acrylonitrile and was usually blended with a rubbery copolpmer which contained a predominant amount of styrene. The thermoplastic copolymers were present in the mixture in amount ranging from 25–90% by weight of the total blend and were prepared by emulsion polymerization in accordance with British Pat. No. 632,722. These mixtures or blends were found to have a number of undesirable characteristics in that, for example, they were not transparent nor did they exhibit a sufficient degree of toughness or tear-resistance primarily because of the low degree of cross-linking of the rubbery copolymer.

For example, in DAS (German published application) No. 1,208,071, polystyrene compositions are disclosed which comprise mixtures of polystyrene or styrene-containing thermoplastic copolymers and various synthetic elastomers containing more than 35% of butadiene in the molecule, see German Pat. No. 892,826. These blends or mixtures are stated to have been prepared at high temperatures with short periods of polymerization and quantitative conversions, and may contain, if desired, various other additives including, for example, mold-release agents, plasticizers or the like. In these particular thermoplastic compositions, the ratio of the thermoplastic component to the elastomeric component ranges from between 10:0.5 and 1:1 which corresponds to the approximate proportions of between 95:5 and 50:50.

It is generally known that these particular compositions may be prepared either by emulsion, bulk or suspension polymerization techniques. It is important to note, however, that these prior art mixtures, in most instances, only have a low degree of flexural strength, which may range, for example, between 400 and 900 kp./cm.² as measured in accordance with DIN (German industrial standard) 53,455. Accordingly, when thermoplastic compositions or blends prepared in accordance with the techniques of the prior art are subjected to stress by impact or flexion, there is a phenomenon which takes place known as phase separation wherein the elastomeric component separates from the thermoplastic component, and is seen and referred to as white fracture. Thus, to overcome and avoid these problems, it has been found, in accordance with this invention, that a thermoplastic mass can be prepared which may be used for the production of transparent, tough and flexibly strong bodies without white fracture.

More specifically, it has been found that the thermoplastic compositions of this invention are particularly suitable for the production of transparent, tear-resistant (tough), molded bodies which have high-flexural strengths and are resistant to phase separation under stress.

Accordingly, it is an object of this invention to provide a thermoplastic composition which is substantially resistant to phase separation and can be used for the production of clear, tough, molded bodies having high-flexural strengths.

It is another object of this invention to provide a thermoplastic composition comprising a homogeneous blend of (1) a thermoplastic copolymer and (2) a rubbery copolymer which is resistant to white fracture and capable of being extruded or molded into various objects by conventional techniques.

It is still a further object of this invention to provide a process for the preparation of a homogeneous thermoplastic composition suitable for the production of transparent, tear-resistant objects having high-flexural strengths without white fracture.

It is still another object of this invention to provide a thermoplastic composition comprising a homogeneous blend of a specific amount of (1) a rubbery copolymer and (2) a thermoplastic copolymer in specific proportions which may be used to prepare various articles including extruded or molded bodies, films, coatings and the like.

Upon further study of the specification and claims, other objects and advantages of the present invention will become apparent.

It has been found that a thermoplastic composition suitable for the production of transparent, tear-resistant (tough) bodies having high-flexible strengths without white fracture can be prepared from a homogeneous blend of a rubbery copolymer and a thermoplastic copolymer in critical proportions.

More specifically, the thermoplastic composition of this invention comprises a blend of (1) 3–17 parts by weight of a highly thermally cross-linked rubbery copolymer consisting essentially of 35–65% by weight of styrene and 35–65% by weight of butadiene and (2) 83–97 parts by weight of a thermoplastic copolymer consisting essentially of 65–83% by weight of styrene and 17–35% by weight of acrylonitrile. The rubbery copolymer may be further characterized as having been polymerized in the presence of up to about 0.1% of a control or regulating agent based on the weight of the copolymerization mass.

More particularly, the copolymerization of the butadiene and styrene may take place in the presence of 0.001 to 0.1, preferably 0.01 to 0.1% by weight of the control agent, based on the weight of the polymerization mass at high temperatures, e.g., 110° C., over short periods of polymerization, with high quantitative conversion, e.g., conversions ranging up to about 100%. It is also important that the rubbery copolymer of butadiene and styrene be copolymerized under conditions which result in highly cross-linked copolymers, e.g., cross-linked to an extent of at least 90% without using known cross-linking agents, e.g. divinyl-benzene; that is to say cross-linking is performed only by heat (polymerization at high temperatures). The thermoplastic copolymers used in preparing the homogeneous blend may be prepared by copolymerizing styrene and acrylonitrile in the above-stated critical proportions by various techniques, preferably excluding, however, emulsion polymerization. The techniques that may be used in preparing the thermoplastic copolymers may include, for example, bulk or suspension polymerization techniques wherein various catalysts including, for example, the organic peroxides such as benzoyl peroxide, are employed.

The thermoplastic compositions of this invention which are particularly useful for preparing molded articles comprise a rubbery butadiene-styrene copolymer wherein the butadiene is present in amounts ranging from 35–65% and more specifically 40%. The styrene-acrylonitrile copolymerizates, when blended with the rubbery copolymers, form a mass capable of being molded into various articles exhibiting high-rigidity, high-surface hardness, high heat and temperature variation stability, as well as an outstanding resistance to chemicals, weather and the like. The toughness (notch impact strength) of the molded articles is substantially superior, if not twice as high, as the strength of most other commercially available articles containing the acrylonitrile-styrene copolymers.

The flexural strengths of the articles obtained from the blends of this invention are above 950 kp./cm.² and in most instances range between 950 and 1400 kp./cm.², as measured in accordance with DIN 53,455. (kp.=the power by which the mass of 1 kg. is attracted by the earth at a latitude of 45° in Paris. Literature: Heywang-Nücke-Timm "Physik fuer Techniker" Publishers: Handwerk and Technik, Hamburg, 4th edition (1964), page 9.)

The rubbery copolymers of this invention comprise the copolymerization of butadiene and styrene by methods well known in the prior art, and particularly include emulsion polymerization of the monomers in the presence of 0.01 to 0.02% by weight of a cataylst, such as potassium persulfate. In addition, other auxiliary agents which may be included in the polymerization mass include, for example, barium sulfate, sodium carbonate, caustic soda, and various emulsifiers, such as sodium butylnaphthalene sulfonate, potassium oleate, sodium lauryl sulfate, sodium salts of dodecylbenzene sulfonic acid, and the like. Further details in regard to the emulsion polymerization of butadiene and styrene copolymers may be found in the text "Synthetic Rubber" by Whitby, published by John Wiley & Sons (1954). The rubbery copolymers are characterized as being highly thermally cross-linked to the extent of at least 90% which may be measured in tetrahydrofuran at a centrifuge velocity of 1500 r.p.m. The cross-linking of the rubbery copolymer is accomplished, as more particularly pointed out in German Pat. No. 892,826, by utilizing high temperatures, short polymerization periods and quantitative conversion.

In carrying out the copolymerization, it is well known to use regulating or control agents, as particularly pointed out in Table I hereinbelow, which may be present in the polymerization mixture in amounts ranging up to about but not exceeding 0.1% by weight of the mass. The amount of control agent is critical in order to avoid impairing the mechanical strength and heat stability of the final products. The particular type of regulating or control agent, however, is not critical and any of the conventionally known compounds may be employed which may include, for example, hydroquinone, the alkali metal salts of the lower alkyl dithiocarbamates, e.g., sodium dimethyldithiocarbamate hydroxylamines, and various other well-known control agents, e.g. dodecyl mercaptan, tert. dodecyl mercaptan, diisopropyl xanthogen disulfide.

As previously indicated, the quantitative proportion of butadiene to styrene is critical in obtaining the desired products and, therefore, it has been found that it is essential to prepare the copolymer wherein the butadiene to styrene ratio ranges between 35 to 65 and 65 to 35, and more preferably in ratios of butadiene to styrene of between 40 to 60 and 50 to 50. More specifically, the polymerization may take place at a temperature, for example, of about 110° C., over a period until the conversion is 100%.

The polymerization is quantitatively terminated by rapidly increasing the temperature up to about 120° C.

In order to obtain the desired transparency in the thermoplastic composition of this invention, it was found that the thermoplastic copolymer to be employed in the blend must be obtained by a polymerization technique other than by emulsion polymerization. In other words, the copolymerization of acrylonitrile and styrene may take place in the form of a suspension, and even more preferably by bulk polymerization. Bulk polymerization is normally carried out with heat particularly at a temperature ranging between 140–160° C. When employing the suspension technique, the polymerization is conducted in the presence of monomer-soluble catalysts which may include, for example, well-known catalysts such as benzoyl peroxide, tertiary-butyl peroxide, etc. In addition, conventional polymerization stabilizers and protective colloids may be added. These may include the conventional recipes and procedures normally used in effecting mass or suspension copolymerization of styrene and acrylonitrile, which are well known in the art and, therefore, need not be reiterated in detail here.

The thermoplastic blend of this invention may be obtained by mixing the two copolymers, i.e., the rubbery and thermoplastic copolymers, in the above-indicated quantitative proportions in a roller or Banbury mixer or in any other suitable mixing unit including, for example, a screw or planet extruder. Excellent homogeneous blends are obtained with the two copolymers in these mixing units at temperatures ranging from 120 to 180° C. and more preferably at temperatures between 130 and 140° C. with rolling times ranging from about 5-12 minutes and more specifically approximately 7 minutes.

Without further elaboration, it is believed that one skilled in the art can, using the preceding description, utilize the present invention to its fullest extent. The skilled in the art can, using the preceding description, to be construed as merely illustrative, and not limitative of the remainder of the specification and claims in any way whatsoever.

EXAMPLE 1

A mixture consisting essentially of 5 parts by weight of a copolymer consisting of 60 parts by weight of styrene and 40 parts by weight of butadiene, known commercially under the trade-name Duranit 40, and 95 parts by weight of a copolymer consisting of 72 parts by weight of styrene and 28 parts by weight of acrylonitrile obtained by polymerization known commercially under the trade-name Vestoran 60, was mixed on a rolling mill at 135° C. for about 10 minutes. Subsequently, the mixture obtained was comminuted and granulated. From the granulated material, standard small rods were prepared by injection molding. These rods were transparent and exhibited the following properties.

Test: Data
Toughness (determined by Notched Bar Test) DIN 53,453 _____ 35-40 cm. kp./cm.$^2$.
Notched bar impact strength DIN 53,453 _____ 3-4 cm. kp./cm.$^2$.
Flexure strength DIN 53,452 _ 1300-1400 kp./cm.$^2$.
Softening point _____ 102-104° C.

obtained by bulk polymerization known under the tradename of Vestoran 60 was mixed with 6 parts by weight, based on the total weight of the mixture, of a chlorinated paraffin (52% chlorine). This mixture was blended by the same procedure set forth in Example 1. The transparent test rods obtained from the granulated polymeric blends had the following properties:

Test: Data
Toughness _____ 37 cm. kp./cm.$^2$.
Notched bar impact strength _____ 3 cm. kp./cm.$^2$.
Flexure strength _____ 1,320 kp./cm.$^2$.
Softening point _____ 97° C.

The control agents used in preparing the rubbery copolymer of the examples were dodecyl mercaptan or diisopropyl xanthogen disulfide.

The compositions prepared in accordance with the method of this invention, as particularly set forth in the examples, were subjected to the following tests as shown in Tables I, II and III with the accompanying data.

TABLE I

| Ex. | Copolymer Rubbery butadiene: styrene percent ratio | Thermoplastic acrylonitrile: styrene percent ratio | Percent rubbery | Percent thermo-plastic | Tear strength, cm. kp./cm.$^2$, DIN 53,453 | Notch impact resistance (toughness), cm. kp./cm.$^2$, DIN 53,453 | Flexural strength, kp./cm.$^2$, DIN 53,452 | Softening point, ° C.* | Transparent, yes/no | White fracture, yes/no |
|---|---|---|---|---|---|---|---|---|---|---|
| 1** | 40:60 | 28:72 | 3 | 97 | 34.1 | 2.5 | 1,366 | 102 | Yes | No |
| 2** | 40:60 | 28:72 | 5 | 95 | 35.7 | 3.0 | 1,338 | 102 | Yes | No |
| 3** | 40:60 | 28:72 | 10 | 90 | 37.8 | 3.5 | 1,094 | 101 | Yes | No |
| 4** | 40:60 | 28:72 | 15 | 85 | 47.0 | 3.5 | 998 | 100 | Yes | No |
| 5 | 40:60 | 28:72 | 20 | 80 | 38.1 | 2.0 | 850 | 103 | Yes | Yes |
| 6 | 40:60 | 28:72 | 25 | 75 | 32.9 | 2.0 | 775 | 103 | Yes | Yes |
| 7 | 40:60 | 28:72 | 30 | 70 | 33.7 | 2.0 | 688 | 102 | Yes | Yes |
| 8 | 40:60 | 28:72 | 35 | 65 | 34.9 | 2.0 | 544 | 101 | Yes | Yes |

*British Standard 1,493/48.
**Molded masses of invention.

It should be noted from the data in Table I that Examples 1-4 prepared in accordance with this invention resulted in products which were transparent and had no white fracture. In addition, the tear-strength, impact-resistance (toughness) and flexural strength of the products obtained by this invention were substantially superior to the same blends of thermoplastic and rubbery copolymers, except that the amount of the rubbery copolymer used in preparing the blends of Examples 5-8 were not within the critical ranges set forth by this invention.

TABLE II

| Example | Butadiene styrene percent ratio [1] | Percent conversion | Percent regulator [2] | Acrylonitrile styrene percent ratio [3] | Percent butadiene styrene [4] | Percent acrylonitrile styrene [5] | Tear strength [6] | Impact resistance [7] | Flexural strength [8] | Softening point, ° C. [9] | Transparent, yes/no | White fracture, yes/no |
|---|---|---|---|---|---|---|---|---|---|---|---|---|
| 1 | 40:60 | 60 | | 28:72 | 3 | 97 | 20.6 | 3.1 | 1,325 | 104 | Yes | No |
| 2 | 40:60 | 60 | | 28:72 | 5 | 95 | 21.4 | 2.9 | 1,281 | 103 | Yes | No |
| 3 | 40:60 | 80 | | 28:72 | 3 | 97 | 20.6 | 3.1 | 1,363 | 103 | Yes | No |
| 4 | 40:60 | 80 | | 28:72 | 5 | 95 | 21.8 | 3.1 | 1,325 | 102 | Yes | No |
| 5 [10] | 40:60 | 100 | 0.1 | 28:72 | 3 | 97 | 38.8 | 3.7 | 1,363 | 104 | Yes | No |
| 6 [10] | 40:60 | 100 | 0.1 | 28:72 | 5 | 95 | 39.3 | 3.7 | 1,344 | 103 | Yes | No |
| 7 | 40:60 | 60 | 0.3 | 28:72 | 3 | 97 | 20.6 | 2.0 | 1,481 | 98 | Yes | No |
| 8 | 40:60 | 60 | 0.4 | 28:72 | 5 | 95 | 23.0 | 1.9 | 1,494 | 98 | Yes | No |
| 9 | 40:60 | 100 | 0.3 | 28:72 | 3 | 97 | 24.0 | 1.9 | 1,469 | 99 | Yes | No |
| 10 | 40:60 | 100 | 0.3 | 28:72 | 5 | 95 | 23.1 | 1.2 | 1,462 | 100 | Yes | No |

[1] Rubbery copolymer of butadiene and styrene.
[2] Dodecyl mercaptan.
[3] Thermoplastic copolymer of acrylonitrile and stryene.
[4] Percent of rubbery copolymer of butadiene and styrene.
[5] Percent of thermoplastic copolymer of acrylonitrile and styrene.
[6] Cm. kp./cm.$^2$, DIN 53,453.
[7] Notch impact resistance (toughness), cm. kp./cm.$^2$, DIN 53,453.
[8] Kp./cm.$^2$
[9] Softening point, British Standard 1,493/48.
[10] Molded masses of invention.

EXAMPLE 2

A mixture consisting of approximately 5 parts by weight of a copolymer of 40 parts by weight of butadiene and 60 parts by weight of styrene known under the tradename of Duranit 40, and 95 parts by weight of a copolymer consisting of 28% acrylonitrile and 72% styrene It should be noted from the data in Table II that Examples 5 and 6 prepared in accordance with the method of this invention had improved tear-strength and notch impact-resistance in comparison to the other examples in the table which either contained more than 0.1% of the regulator (Examples 7–10) or no regulator at all (Examples 1–4).

TABLE III

| Rubbery butadiene: styrene percent ratio | Copolymer Thermoplastic acrylonitrile: styrene percent ratio | Percent rubbery | Percent thermoplastic | Tear strength, cm.kp./cm.² DIN 53,453 | Notch impact resistance (toughness), cm.kp./cm.², DIN 53,453 | Flexural strength, kp./cm.², DIN 53,452 | Softening point, °C.* | Transparent, yes/no | White fracture, yes/no |
|---|---|---|---|---|---|---|---|---|---|
| 75:25 | 28:72 | 3 | 97 | 23.8 | 2.0 | 1,363 | 101 | No | No |
| 75:25 | 28:72 | 5 | 95 | 32.5 | 2.0 | 1,294 | 102 | No | No |
| 75:25 | 28:72 | 10 | 90 | 20.0 | 2.5 | 1,288 | 102 | No | No |
| 100:0 cis | 28:72 | 3 | 97 | 25.6 | 2.0 | 1,356 | 102 | | |
| 100:0 cis | 28:72 | 5 | 95 | 28.1 | 2.0 | 1,263 | 102 | No | No |
| 100:0 cis | 28:72 | 10 | 90 | 23.9 | 2.5 | 1,193 | 102 | No | No |
| 40:60 | 15:85 | 3 | 97 | 25.6 | 1.5 | 1,243 | 100 | No | No |
| 40:60 | 15:85 | 5 | 95 | 31.5 | 1.5 | 1,181 | 100 | No | No |
| 40:60 | 15:85 | 10 | 90 | 29.0 | 0.6 | 1,000 | 100 | No | No |
| 40:60 | 12:88 | 3 | 97 | 35.7 | 2.0 | 1,188 | 92 | No | No |
| 40:60 | 12:88 | 5 | 95 | 33.4 | 2.0 | 1,150 | 92 | No | No |
| 40:60 | 12:88 | 10 | 90 | 28.7 | 1.5 | 981 | 90 | No | No |

* British Standard, 1,493/48.

It should be noted from the data in Table III that none of the products prepared from the blends of the thermoplastic and rubbery copolymers were transparent and did show white fracture. In each of the examples in Table III, the relative proportions used in preparing the thermoplastic copolymers and the rubbery copolymers were not within the ranges set forth by the method of this invention.

Thus, in view of the comparative data in Tables I, II and III, it is seen that it is essential, not only to use the control agent in an amount ranging up to about 0.1% in preparing the copolymer of butadiene and styrene, but it is also essential to prepare the thermoplastic blends of this invention with the particular ratios set out hereinabove. All of the data given in the above tables were measured on injection-molded standard small rods prepared in accordance with DIN 53,452 and 53,453.

In addition, the blends of this invention can, of course, contain other conventional additives which may include, for example, liquid paraffin (petrolatum), bone oil, esters of aliphatic carboxylic acids having at least 12 carbon atoms or more, etc. A preferable additive may include the chlorinated paraffins in amounts of 1–6% by weight and more preferably in amounts of 2–4% by weight of the total blend. It is obvious, moreover, that the homogeneous blends of this invention may be colored by adding conventional pigments or dyes commercially available and known to be used with acrylonitrile-styrene copolymers.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A thermoplastic composition for the preparation of tough, transparent articles having high-flexural strengths which comprises a homogeneous blend of (1) 3 to 17 parts by weight of a thermally cross-linked rubbery copolymer devoid of chemical cross-linking agents, said copolymer consisting essentially of 35–65% by weight of styrene and 35–65% by weight of butadiene, said thermal crosslinking being to the extent of at least 90%, and (2) 83 to 97 parts by weight of a thermoplastic copolymer consisting of 65–83% by weight of styrene and 17–35% by weight of acrylonitrile; said rubbery copolymer characterized as having been copolymerized in the presence of up to about 0.1% of a control agent based on the weight of the polymerization mass, said control agent being selected from the group consisting of hydroquinone, an alkali metal salt of a lower alkyl dithiocarbamate, an alkyl mercaptan and a dialkyl xanthogen disulfide; and said thermoplastic copolymer having been copolymerized by other than emulsion polymerization.

2. The thermoplastic composition of claim 1 further characterized in that the rubbery copolymer consists essentially of 40% by weight of butadiene and 60% by weight of styrene.

3. The composition of claim 1 further characterized in that the thermoplastic composition consists essentially of 28% by weight of acrylonitrile and 72% by weight of styrene.

4. A composition as defined by claim 1 wherein the weight ratio of butadiene to styrene is 40:60 to 50:50 respectively.

5. A shaped article of a thermoplastic composition as defined by claim 1.

6. A shaped article of a thermoplastic composition as defined by claim 4.

7. A composition as defined by claim 1 wherein said rubbery copolymer was copolymerized at about 110° C. until 100% conversion was reached.

8. A shaped article of a thermoplastic composition as defined by claim 7.

References Cited

UNITED STATES PATENTS

| | | | |
|---|---|---|---|
| 2,550,139 | 4/1951 | Daly | 260—893 |
| 2,600,024 | 6/1952 | Romeyn et al. | 260—893 |
| 3,041,310 | 6/1962 | Luftglass et al. | 260—876 |
| 3,090,767 | 5/1963 | Colgan et al. | 260—893 |
| 3,328,488 | 6/1967 | Declaretaz | 260—893 |

SAMUEL H. BLECH, Primary Examiner

U.S. Cl. X.R.

260—28.5, 41.5, 84.3